P. R. GLASS.
LOADING MECHANISM FOR HAND TACKERS.
APPLICATION FILED APR. 26, 1906. RENEWED NOV. 22, 1909.

957,948.

Patented May 17, 1910.
5 SHEETS—SHEET 1.

Witnesses:
Robert H. Kammler.
Everitt S. Emery.

Inventor:
Perley R. Glass
by Emery & Booth
attys.

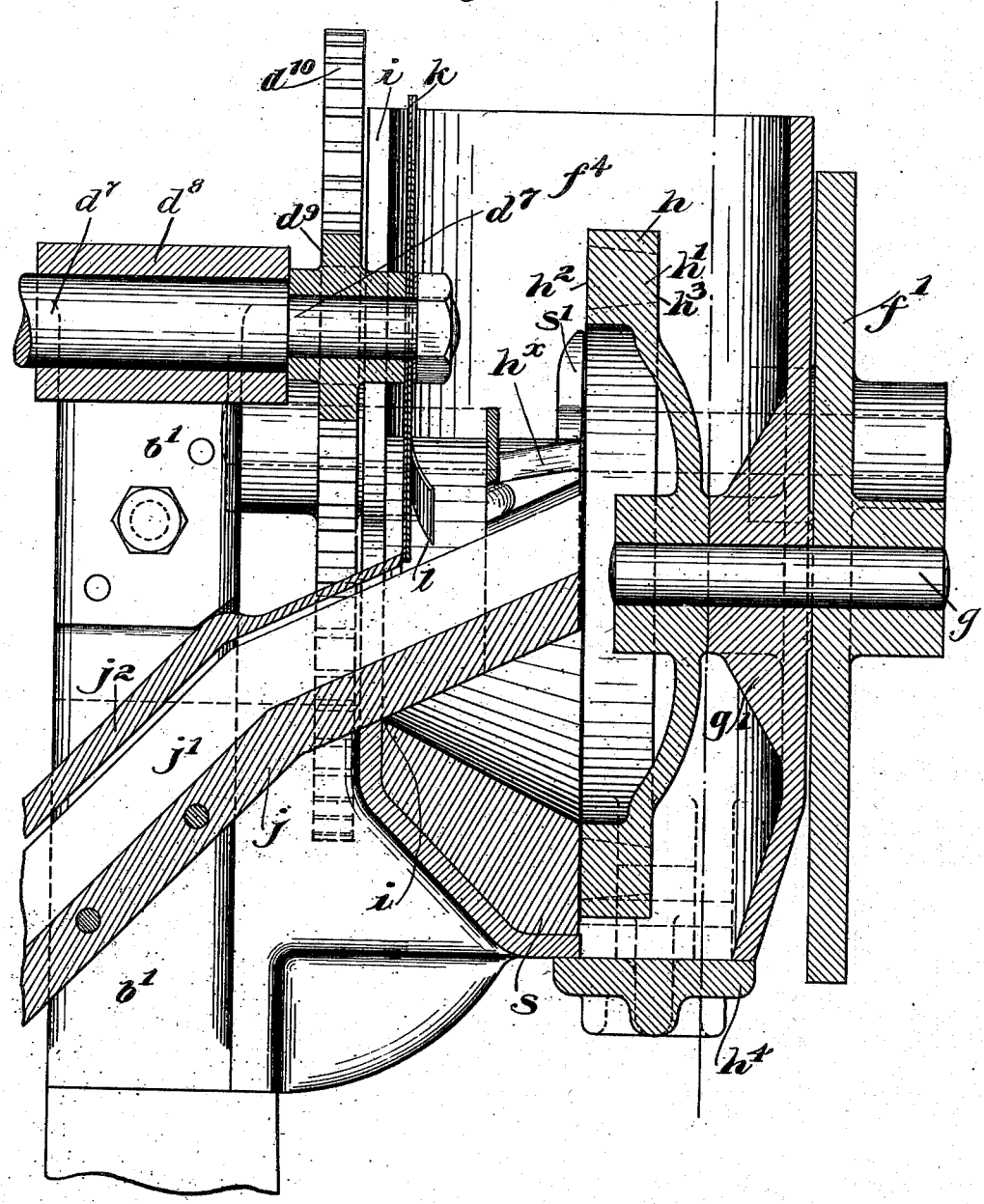

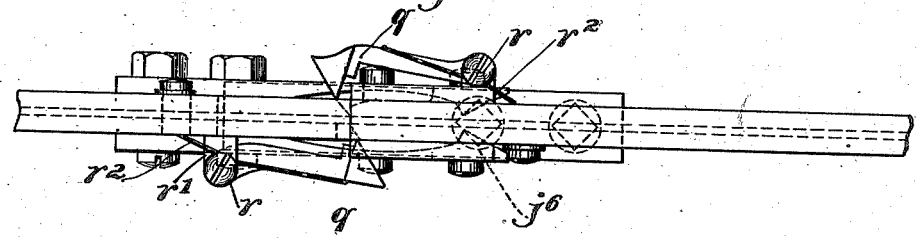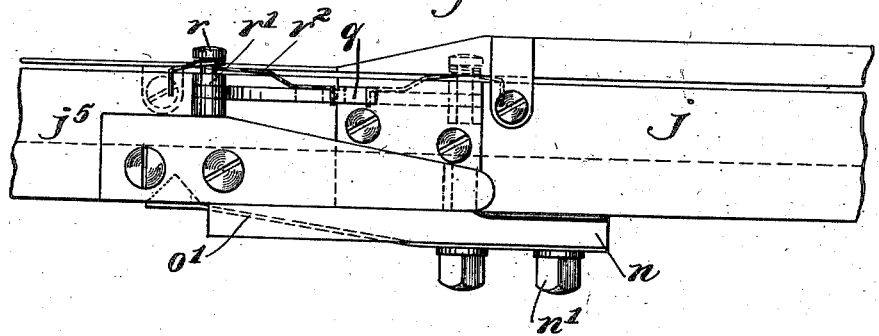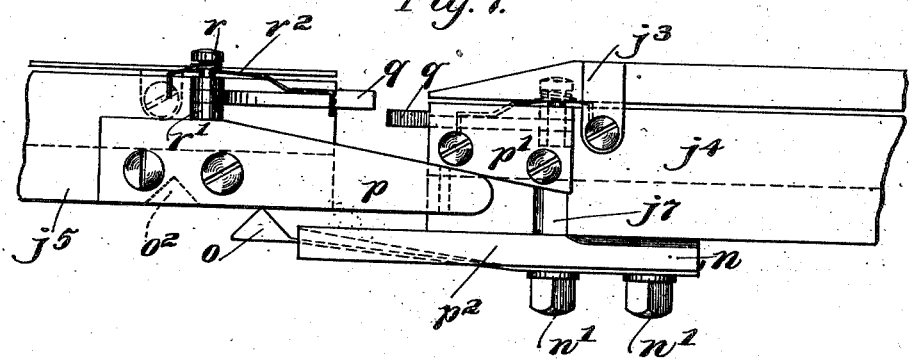

UNITED STATES PATENT OFFICE.

PERLEY R. GLASS, OF QUINCY, MASSACHUSETTS, ASSIGNOR, BY MESNE ASSIGNMENTS, TO THOMAS G. PLANT, OF BOSTON, MASSACHUSETTS.

LOADING MECHANISM FOR HAND-TACKERS.

957,948.     Specification of Letters Patent.     Patented May 17, 1910.

Application filed April 26, 1906, Serial No. 313,727. Renewed November 22, 1909. Serial No. 529,293.

*To all whom it may concern:*

Be it known that I, PERLEY R. GLASS, a citizen of the United States, residing at Quincy, in the county of Norfolk and State of Massachusetts, have invented an Improvement in Loading Mechanism for Hand-Tackers, of which the following description, in connection with the accompanying drawings, is a specification, like letters on the drawings representing like parts.

My invention relates to loading mechanism employed in connection with hand tacking devices most commonly employed in lasting boots and shoes.

The type of loading machine to which my invention more particularly relates is that wherein the loader and the hand tacker are both provided with raceways, fitted at their adjoining ends with coupling devices by which they may be coupled together to form in effect one continuous raceway extending from the loader to the hand tacker.

My invention comprises improved means for guiding and coupling the two raceways together as they are brought into coöperating relation, and other features to be hereinafter referred to.

When the tacker is detached for use, its raceway part is removed with it and supplies the tacks for a limited use of the tacks during which time the hopper or loader raceway is being filled with tacks. When the tacker raceway is exhausted it is coupled to the loader raceway and the tacks previously loaded therein slide in a body down into and fill the tacker raceway, which may be again removed for use.

Figure 1:
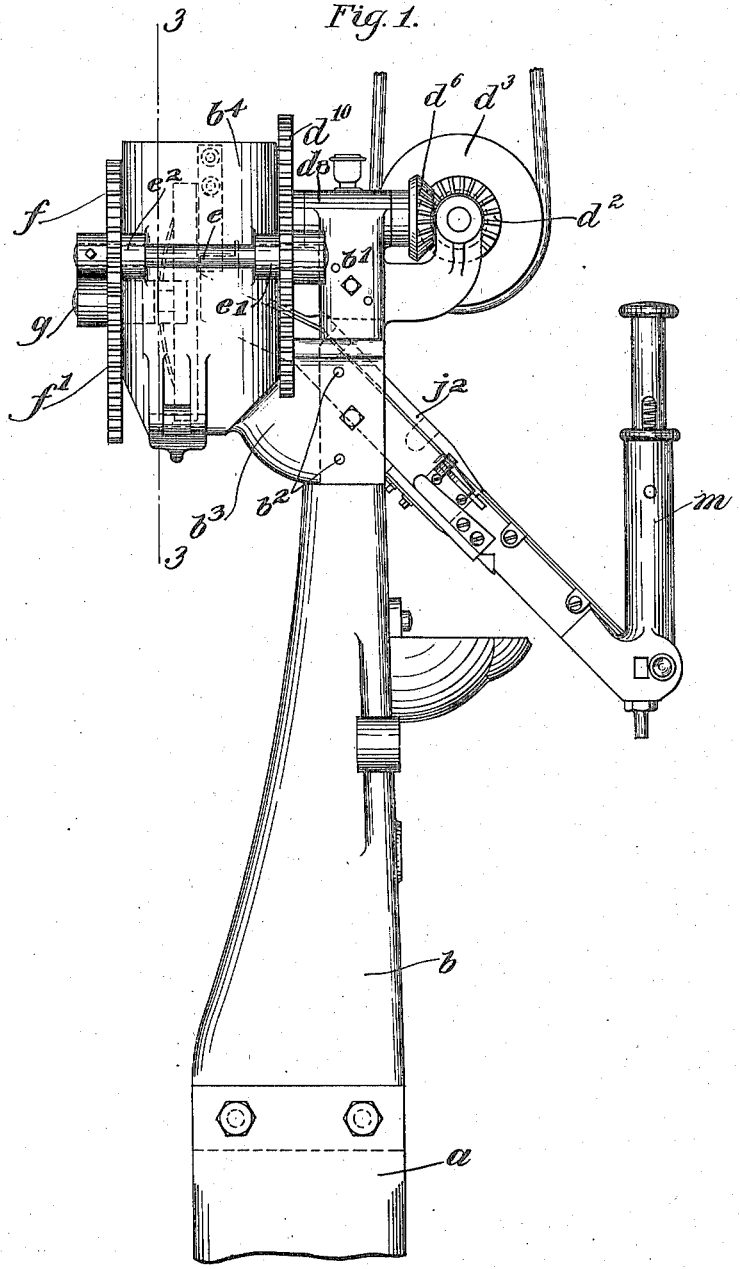
Figure 2:
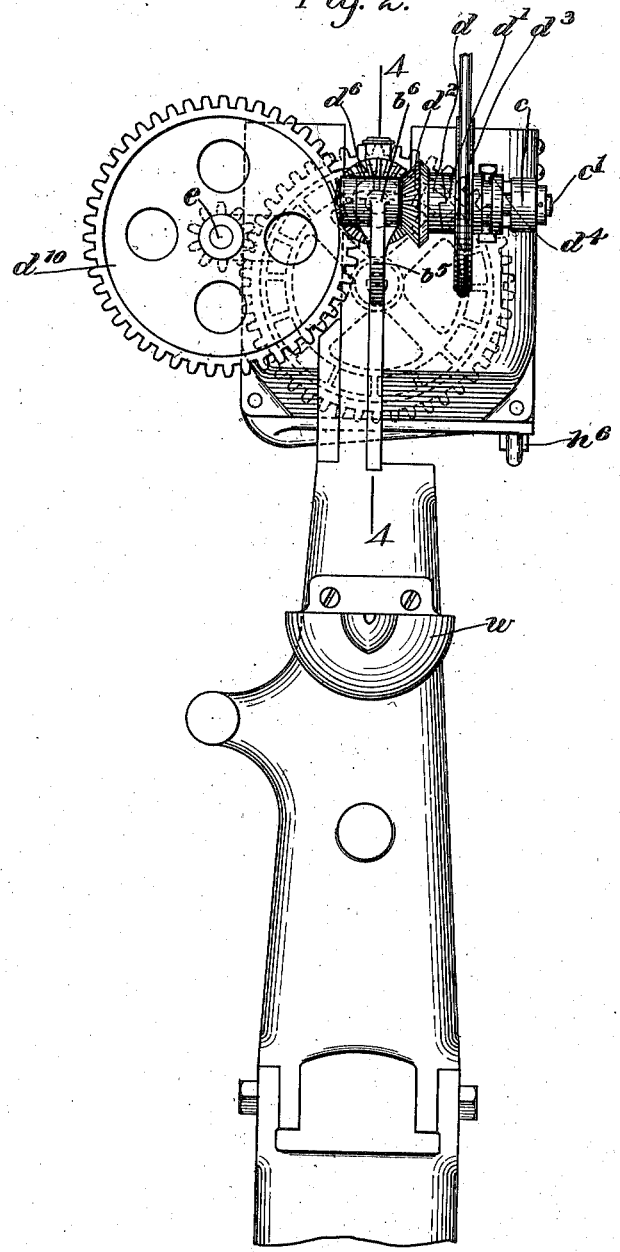
Figure 3:
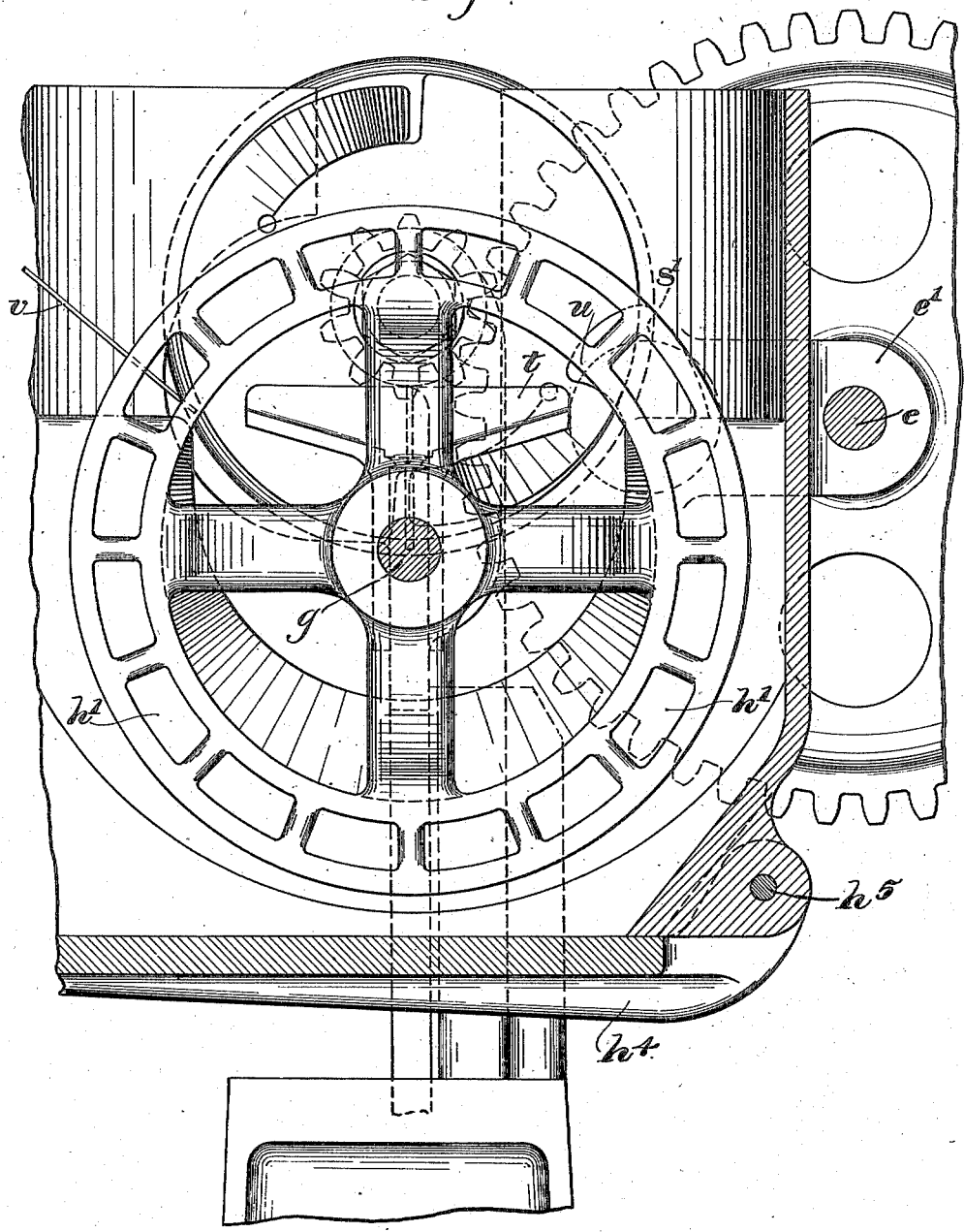

In the embodiment of my invention selected herein for illustration; Figure 1 is a side elevation of a machine containing my improved loading mechanism showing the tacker attached thereto to be loaded. Fig. 2 is the front elevation of the same. Fig. 3 is a vertical, transverse, sectional view through the hopper on line 3—3, Fig. 1, viewed from the rear. Fig. 4 is a vertical longitudinal section through the hopper on the line 4—4, Fig. 2, viewed from the right. Fig. 5 is a plan view of the abutting ends of the two parts of the raceway showing the coupling device. Fig. 6 is a side elevation of the same, and Fig. 7 a similar view with the ends separated as in the act of coupling and uncoupling.

Referring to Fig. 1, the base or column $a$ supports the head $b$ which is provided at its top with the post $b'$, to one side of which is attached by screws $b^2$ the bracket $b^3$ of the hopper $b^4$. To the opposite side of the post $b'$, see Fig. 2, is attached a second bracket $b^5$ carrying the bearing $b^6$. To the front of the hopper, Fig. 2, at the right of the post $b'$ is secured the bearing $c$. In the bearings $b^6$ and $c$ revolves a shaft $c'$ carrying the two clutch members $d$ and $d'$ having secured thereto respectively bevel gear $d^2$ and the pulley $d^3$, the latter equipped with a shipper $d^4$. The pulley $d^3$ is belted to any suitable source of power. The bevel gear $d^2$ meshes with gear $d^6$ fast on a shaft $d^7$, see Fig. 4, supported in a bearing $d^8$ at the top of said post $b'$, and to the other end of said shaft $d^7$ is secured a gear $d^9$ (Fig. 4) which in turn meshes with the larger gear $d^{10}$ secured to the end of a shaft $e$, Figs. 1 and 3, running in bearings $e'$ and $e^2$, see Fig. 1, formed in the side of the hopper $b^4$. To the opposite rear end of the shaft $e$, Fig. 1, is secured the gear $f$ in mesh with the gear $f'$ on the end of the lifter shaft $g$, mounted in bearing $g'$ in the rear wall of the hopper. To the inner end of this shaft $g$ is secured the tack lifter wheel $h$, in the inside rim of which are provided the pockets $h'$, Figs. 3 and 4, having openings $h^2$, in the front of the wheel and at $h^3$, on the back thereof, the top and bottom walls of said pocket opening and spreading toward the front.

A door $h^4$, see Figs. 3 and 4, is hinged at $h^5$ and forms the bottom of the hopper, permitting access when desired to the interior of the hopper and also for discharging its contents, the door being locked by a button $h^6$. At the front of the hopper the wall is cut away in the center, as at $i$, Fig. 4, from the top to a point low enough to admit the end of a raceway $j$, which is secured to the post $b'$, and extends into the hopper and close to the tack lifting wheel $h$, Fig. 4. Through this opening in the front of the hopper extends the reduced inner end of the shaft $d^7$, having secured thereto the clearing disk $k$, provided with narrow circumferential wings $l$, one of the ends of which are secured to the disk, the other ends being free and slightly sprung inward so that as the disk revolves the wings will brush any improperly positioned tacks from the top of the raceway.

The raceway $j$ is provided at its top with the slot $j'$ through which the tacks may slide points down, with their heads resting upon the sides of the raceway, protected by the cover $j^2$ secured to the said sides by brackets $j^3$ and screws $j^4$, see Fig. 7.

The tacks in bulk are placed in the hopper from which they are lifted by the lifter and deposited on an inclined table $h^x$ down which they gravitate to the upper end of the raceway. Such tacks as may, fall point first into the raceway, all others being brushed aside by the clearer wheel $k$.

As stated the raceway is in two parts $j$ and $j^5$ one part $j$ being secured to the post $b'$ and the other to the removable tacker $m$, Fig. 1. The two adjacent ends of the two parts of the raceway are provided with coupling members as follows: The part $j$ is provided on its under face with a table or rest $n$, secured thereto by screws $n'$, said rest being slotted longitudinally and obliquely through its center as at $o'$ in dotted lines, Fig. 6, to receive the spring locking member $o$ adapted to enter a V-shaped slot $o^2$ in the under side of the part $j^5$ of the raceway. The removable raceway part $j^5$ is provided on its opposite sides with the spring coupling members, $p$ having on their inner faces, at their ends V-shaped lugs $j^6$ (Fig. 5) adapted to enter similarly shaped depressions $j^7$, (Fig. 7) in the sides of the part $j$. Coöperating with the coupling members $p$ and to hold them down in proper position are the lugs $p'$ one on each side of the stationary part $j$.

The coupling members described provide a sure and readily manipulated means for coupling the abutting ends of the two parts of the raceway when brought together end to end and the parts may be readily unlocked by a straight outward or downward pull upon the part $j^5$. As will be seen, when the abutting faces of the raceway sections are brought into proximity, the outwardly inclined ends of the lugs $j^6$, by engagement with the sides of the part $j$, guide the sections into transverse alinement, while the lugs $p'$, by engagement with the members $p$, force the part $j^5$ into engagement with the supporting lug $p^2$, thereby bringing the sections into vertical alinement. The lug $p^2$ therefore, besides supporting the movable part or section when the parts are coupled together, coöperates with the lugs $p'$ in bringing the parts into alinement, while the lugs $j^6$ perform the dual function of guiding the parts into alinement and locking them in operative position. This is a more convenient form of coupling than heretofore largely used and requiring a more or less unnatural swinging movement. While I have here shown the spring locking member $o$ and V-shaped slot $o^2$ nevertheless such member is not necessary to provide a secure coupling and may be discarded without impairing the efficiency of the coupling means shown.

Each part of the raceway is supplied with a spring actuated bevel ended gate, $q$, pivoted at $r$ to a boss $r'$ on the side of the raceway. Around each pivot $r$ is coiled a spring $r^2$ which allows the gate to be forced outward when the two ends of the raceway are brought together and which at once closes the gates across the ends of the raceway when the two parts are uncoupled thus preventing the escape of tacks from the raceway.

As the lifter wheel revolves through the mass of tacks at the bottom of the hopper the tacks in quantities fall into the pockets $h'$ and, owing to the inclination of the walls of the latter, tend naturally to slide toward the front openings, being however prevented from falling out thereof by the guard wall $s$ (Fig. 4) which covers the front of the wheel to the height of the tops of the pockets. Toward the right hand side of the hopper, Fig. 3, looking from the rear said guard wall rises in a semi-circular form as at $s'$ to such point that when the tacks are allowed to fall out from the pockets they may be directed into the mouth of the raceway $j$ by the inclined slide or table $h^x$. As the tacks gravitate into the mouth of the raceway many of them naturally arrange themselves properly in the raceway with their heads resting on the top edges of the sides thereof and their points depending in the raceway. The tacks that do not arrange themselves in this manner fall off or are brushed from the raceway by the wings $l$ of the clearer disk $k$. The tacks slide down the raceway and, being prevented from escaping by the gate $q$ closing the lower end of the raceway, fill the latter, all tacks elevated while the raceway is full falling back into the hopper. Should any tacks chance to fail to fall out from the pockets until the latter have passed the mouth of the raceway and are descending again into the hopper, said tacks will be directed by the inclined table $v$ (Fig. 3) back into the hopper.

When it is desired to refill the tacker it is presented and coupled as described to the lower end of the raceway on the loader when all tacks in the raceway $j$ gravitate at once down into the tacker raceway, this continuing so long as the tacker is coupled to the loader. When the tacker is removed for use the loader continues to fill its raceway preparatory to a second filling of the raceway on the tacker.

The receiver $w$ is secured to the front of the loader to catch any tacks that may escape from the raceway at the moment of separation of the two parts.

Claims—

1. In a tack loading machine for a hand tacker, a two part race-way comprising an upper, stationary and downwardly projecting part and a lower movable part, and locking and unlocking means acting automatically to lock said parts upon bringing said movable part into endwise contact with the stationary part by an upward and forward movement and releasable by a direct downward and outward pull on said movable part, said locking means comprising a locking depression in one part and a coöperating locking member upon the other part.

2. In a tack loading machine for a hand tacker, a two part race-way, one of said parts having a depression and the other of said parts having an automatic locking member to coöperate with said depression to secure the two parts together, and means coöperating with the locking member for guiding said member into locking position.

3. In a machine of the class described, a two-part raceway provided with longitudinally extended locking members provided at their ends with lugs adapted to embrace and secure the other part of the raceway, and one part of the raceway being provided with lugs to coöperate with the locking members on the other part of the raceway and hold them in proper locking position.

4. In a machine of the class described, a two-part raceway provided with longitudinally extended side locking members provided at their ends with laterally projecting lugs adapted to embrace and secure the other part of the raceway, one part of the raceway being provided with lugs to coöperate with the locking member on the other part of the raceway, said lugs and locking members being provided respectively with inclined coöperating edges, and a locking member secured to the bottom of one part of the raceway adapted to enter a coöperating depression in the other part of the raceway.

5. In a tack loading machine for a hand tacker, a race-way having upper, stationary and lower movable parts, a lug on the bottom of said stationary part to sustain said movable part when the meeting faces are in contact, and locking means for said parts operating automatically upon bringing the movable part into endwise contact with the stationary part.

6. In a tack loading machine for a hand tacker, a two part race-way, one part having resilient headed members projecting therefrom, the other part having depressions for the reception of the heads of said resilient members, and means for embracing and guiding said members as the race-way parts are brought into endwise contact to effect an engagement of said heads and depressions to automatically lock the parts together and preserve their alinement.

7. In a tack loading machine for a hand tacker, a two part race-way, a lug on one of said parts adapted to guide said parts into proper endwise contact, and automatically operating locking means for said parts carried by said lug.

8. In a tack loading machine for a hand tacker, a two part raceway comprising an upper, stationary, and downwardly projecting part and a movable part, and locking and unlocking means acting automatically to lock said parts upon bringing said movable part into endwise contact with the stationary part by an upward and forward movement and releasable by a direct downward and outward pull on said movable part.

9. In a tack loading machine for a hand tacker, a two part raceway comprising an upper, stationary, and downwardly projecting part and a movable part, and locking means for securing said parts together, said locking means being releasable by a direct downward and outward pull on said movable part.

10. In a fastener driving apparatus, a raceway having stationary and movable parts provided with meeting faces, means on said stationary part to sustain said movable part when said meeting faces are in contact, means for forcing said movable part into engagement with said sustaining means as said faces are brought into proximity, whereby said parts are brought into alinement, and means for locking said parts together.

11. In a tack loading machine for a hand tacker, a two part raceway, said parts having abutting faces, means for guiding said parts into transverse alinement as said abutting faces are brought into proximity by endwise movement, means for simultaneously guiding said parts into vertical alinement, and automatic locking devices for uniting said two part raceway when brought together by endwise movement.

In testimony whereof, I have signed my name to this specification, in the presence of two subscribing witnesses.

PERLEY R. GLASS.

Witnesses:
SIDNEY F. SMITH,
EVERETT I. EMERY.